US009850774B2

United States Patent
Vo (10) Patent No.: US 9,850,774 B2
(45) Date of Patent: Dec. 26, 2017

(54) FLOW DIVERTER ELEMENT AND ASSEMBLY

(71) Applicant: United Technologies Corporation, Hartford, CT (US)

(72) Inventor: Tuan David Vo, Middletown, CT (US)

(73) Assignee: United Technologies Corporation, Farmington, CT (US)

( * ) Notice: Subject to any disclaimer, the term of this patent is extended or adjusted under 35 U.S.C. 154(b) by 221 days.

(21) Appl. No.: 14/653,240

(22) PCT Filed: Dec. 16, 2013

(86) PCT No.: PCT/US2013/075475
§ 371 (c)(1),
(2) Date: Jun. 17, 2015

(87) PCT Pub. No.: WO2014/105496
PCT Pub. Date: Jul. 3, 2014

(65) Prior Publication Data
US 2015/0330245 A1 Nov. 19, 2015

Related U.S. Application Data (60) Provisional application No. 61/747,247, filed on Dec. 29, 2012.

(51) Int. Cl.
*F01D 11/00* (2006.01)
*F01D 11/08* (2006.01)
(Continued)

(52) U.S. Cl.
CPC ............... *F01D 11/08* (2013.01); *F01D 9/02* (2013.01); *F01D 11/001* (2013.01);
(Continued)

(58) Field of Classification Search
CPC ......... F05D 2260/6022; F05D 2240/55; F05D 2240/63; F01D 11/001; F01D 11/005; F01D 11/08
(Continued)

(56) References Cited

U.S. PATENT DOCUMENTS 2,214,108 A    7/1938  Grece
3,576,328 A    4/1971  Vose
(Continued)

FOREIGN PATENT DOCUMENTS

WO    WO 03/020469 A1    3/2003
WO    WO 2006/007686 A1  1/2006
(Continued)

OTHER PUBLICATIONS

Extended European Search Report for European Application No. 13867264.7, dated Jan. 15, 2016, 8 pages.
(Continued)

*Primary Examiner* — Marina Tietjen
*Assistant Examiner* — Paul J Gray
(74) *Attorney, Agent, or Firm* — Kinney & Lange, P.A.

(57) ABSTRACT

An assembly for a gas turbine engine, comprises a fairing assembly extending generally axially through a portion of the gas turbine engine, a first component disposed radially inward of the fairing assembly, a second component disposed axially adjacent to the first component, a flow diverter, and a finger seal. The flow diverter includes a mounting portion securing the flow diverter to the first component, and an arm extending in an axial direction from the mounting portion toward the second component. The finger seal includes a fixed end secured between the flow diverter mounting portion and the first component.

11 Claims, 9 Drawing Sheets

(51) Int. Cl.
*F01D 9/02* (2006.01)
*F02C 7/28* (2006.01)

(52) U.S. Cl.
CPC .............. *F01D 11/005* (2013.01); *F02C 7/28* (2013.01); *F05D 2240/55* (2013.01); *F05D 2260/6022* (2013.01)

(58) Field of Classification Search
USPC ........................................... 415/173.1, 173.3
See application file for complete search history.

(56) References Cited

U.S. PATENT DOCUMENTS

| | | |
|---|---|---|
| 3,802,046 A | 4/1974 | Wachtell et al. |
| 3,970,319 A | 7/1976 | Carroll et al. |
| 4,009,569 A | 3/1977 | Kozlin |
| 4,044,555 A | 8/1977 | McLoughlin et al. |
| 4,088,422 A | 5/1978 | Martin |
| 4,114,248 A | 9/1978 | Smith et al. |
| 4,305,697 A | 12/1981 | Cohen et al. |
| 4,321,007 A | 3/1982 | Dennison et al. |
| 4,369,016 A | 1/1983 | Dennison |
| 4,478,551 A | 10/1984 | Honeycutt, Jr. et al. |
| 4,645,217 A | 2/1987 | Honeycutt, Jr. et al. |
| 4,678,113 A | 7/1987 | Bridges et al. |
| 4,738,453 A | 4/1988 | Ide |
| 4,756,536 A | 7/1988 | Belcher |
| 4,793,770 A | 12/1988 | Schonewald et al. |
| 4,815,933 A * | 3/1989 | Hansel .................... F01D 9/042 415/189 |
| 4,883,405 A | 11/1989 | Walker |
| 4,920,742 A | 5/1990 | Nash et al. |
| 4,987,736 A | 1/1991 | Ciokajlo et al. |
| 4,989,406 A | 2/1991 | Vdoviak et al. |
| 4,993,918 A | 2/1991 | Myers et al. |
| 5,031,922 A | 7/1991 | Heydrich |
| 5,042,823 A | 8/1991 | Mackay et al. |
| 5,071,138 A | 12/1991 | Mackay et al. |
| 5,076,049 A | 12/1991 | VonBenken et al. |
| 5,100,158 A | 3/1992 | Gardner |
| 5,108,116 A | 4/1992 | Johnson et al. |
| 5,169,159 A | 12/1992 | Pope et al. |
| 5,174,584 A | 12/1992 | Lahrman |
| 5,188,507 A | 2/1993 | Sweeney |
| 5,211,541 A | 5/1993 | Fledderjohn et al. |
| 5,218,816 A | 6/1993 | Plemmons et al. |
| 5,224,822 A | 7/1993 | Lenahan et al. |
| 5,236,302 A | 8/1993 | Weisgerber et al. |
| 5,246,295 A | 9/1993 | Ide |
| 5,252,026 A | 10/1993 | Shepherd |
| 5,265,807 A | 11/1993 | Steckbeck et al. |
| 5,269,057 A | 12/1993 | Mendham |
| 5,272,869 A | 12/1993 | Dawson et al. |
| 5,273,397 A | 12/1993 | Czachor et al. |
| 5,292,227 A | 3/1994 | Czachor et al. |
| 5,312,227 A | 5/1994 | Grateau et al. |
| 5,338,154 A | 8/1994 | Meade et al. |
| 5,357,744 A | 10/1994 | Czachor et al. |
| 5,370,402 A | 12/1994 | Gardner et al. |
| 5,385,409 A | 1/1995 | Ide |
| 5,401,036 A | 3/1995 | Basu |
| 5,438,756 A | 8/1995 | Halchak et al. |
| 5,474,305 A | 12/1995 | Flower |
| 5,483,792 A | 1/1996 | Czachor et al. |
| 5,522,698 A | 6/1996 | Butler et al. |
| 5,558,341 A | 9/1996 | McNickle et al. |
| 5,560,198 A | 10/1996 | Brewer et al. |
| 5,597,286 A | 1/1997 | Dawson et al. |
| 5,605,438 A | 2/1997 | Burdgick et al. |
| 5,609,467 A | 3/1997 | Lenhart et al. |
| 5,632,493 A | 5/1997 | Gardner |
| 5,634,767 A | 6/1997 | Dawson |
| 5,755,445 A | 5/1998 | Arora |
| 5,851,105 A | 12/1998 | Fric et al. |
| 5,911,400 A | 6/1999 | Niethammer et al. |
| 5,961,279 A | 10/1999 | Ingistov |
| 6,163,959 A | 12/2000 | Arraitz et al. |
| 6,196,550 B1 | 3/2001 | Arora et al. |
| 6,227,800 B1 | 5/2001 | Spring et al. |
| 6,337,751 B1 | 1/2002 | Kimizuka |
| 6,343,912 B1 | 2/2002 | Manteiga et al. |
| 6,358,001 B1 | 3/2002 | Bosel et al. |
| 6,364,316 B1 | 4/2002 | Arora |
| 6,439,841 B1 | 8/2002 | Bosel |
| 6,511,284 B2 | 1/2003 | Darnell et al. |
| 6,578,363 B2 | 6/2003 | Hashimoto et al. |
| 6,601,853 B2 | 8/2003 | Inoue |
| 6,612,807 B2 | 9/2003 | Czachor |
| 6,619,030 B1 | 9/2003 | Seda et al. |
| 6,638,013 B2 | 10/2003 | Nguyen et al. |
| 6,652,229 B2 | 11/2003 | Lu |
| 6,672,833 B2 | 1/2004 | MacLean et al. |
| 6,719,524 B2 | 4/2004 | Nguyen et al. |
| 6,736,401 B2 | 5/2004 | Chung et al. |
| 6,792,758 B2 | 9/2004 | Dowman |
| 6,796,765 B2 | 9/2004 | Kosel et al. |
| 6,805,356 B2 | 10/2004 | Inoue |
| 6,811,154 B2 | 11/2004 | Proctor et al. |
| 6,935,631 B2 | 8/2005 | Inoue |
| 6,969,826 B2 | 11/2005 | Trewiler et al. |
| 6,983,608 B2 | 1/2006 | Allen, Jr. et al. |
| 7,055,305 B2 | 6/2006 | Baxter et al. |
| 7,094,026 B2 | 8/2006 | Coign et al. |
| 7,100,358 B2 | 9/2006 | Gekht et al. |
| 7,200,933 B2 | 4/2007 | Lundgren et al. |
| 7,229,249 B2 | 6/2007 | Durocher et al. |
| 7,238,008 B2 | 7/2007 | Bobo et al. |
| 7,367,567 B2 | 5/2008 | Farah et al. |
| 7,371,044 B2 | 5/2008 | Nereim |
| 7,389,583 B2 | 6/2008 | Lundgren |
| 7,614,150 B2 | 11/2009 | Lundgren |
| 7,631,879 B2 | 12/2009 | Diantonio |
| 7,673,461 B2 | 3/2010 | Cameriano et al. |
| 7,677,047 B2 | 3/2010 | Somanath et al. |
| 7,735,833 B2 | 6/2010 | Braun et al. |
| 7,798,768 B2 | 9/2010 | Strain et al. |
| 7,815,417 B2 | 10/2010 | Somanath et al. |
| 7,824,152 B2 | 11/2010 | Morrison |
| 7,891,165 B2 | 2/2011 | Bader et al. |
| 7,909,573 B2 | 3/2011 | Cameriano et al. |
| 7,955,446 B2 | 6/2011 | Dierberger |
| 7,959,409 B2 | 6/2011 | Guo et al. |
| 7,988,799 B2 | 8/2011 | Dierberger |
| 8,069,648 B2 | 12/2011 | Snyder et al. |
| 8,083,465 B2 | 12/2011 | Herbst et al. |
| 8,091,371 B2 | 1/2012 | Durocher et al. |
| 8,092,161 B2 | 1/2012 | Cai et al. |
| 8,152,451 B2 | 4/2012 | Manteiga et al. |
| 8,162,593 B2 | 4/2012 | Guimbard et al. |
| 8,172,526 B2 | 5/2012 | Lescure et al. |
| 8,177,488 B2 | 5/2012 | Manteiga et al. |
| 8,221,071 B2 | 7/2012 | Wojno et al. |
| 8,245,399 B2 | 8/2012 | Anantharaman et al. |
| 8,245,518 B2 | 8/2012 | Durocher et al. |
| 8,282,342 B2 | 10/2012 | Tonks et al. |
| 8,371,127 B2 | 2/2013 | Durocher et al. |
| 8,371,812 B2 | 2/2013 | Manteiga et al. |
| 2003/0025274 A1 | 2/2003 | Allan et al. |
| 2003/0042682 A1 | 3/2003 | Inoue |
| 2003/0062684 A1 | 4/2003 | Inoue |
| 2003/0062685 A1 | 4/2003 | Inoue |
| 2005/0046113 A1 | 3/2005 | Inoue |
| 2006/0010852 A1 | 1/2006 | Gekht et al. |
| 2006/0197287 A1* | 9/2006 | Farah .................... F01D 11/003 277/549 |
| 2007/0059158 A1* | 3/2007 | Alvanos .................. F01D 5/081 415/115 |
| 2008/0216300 A1 | 9/2008 | Anderson et al. |
| 2009/0317244 A1* | 12/2009 | Howe ...................... F01D 5/08 415/177 |
| 2010/0132371 A1 | 6/2010 | Durocher et al. |
| 2010/0132374 A1 | 6/2010 | Manteiga et al. |
| 2010/0132377 A1 | 6/2010 | Durocher et al. |
| 2010/0202872 A1 | 8/2010 | Weidmann |

(56) References Cited

U.S. PATENT DOCUMENTS

| | | |
|---|---|---|
| 2010/0236244 A1 | 9/2010 | Longardner |
| 2010/0275572 A1 | 11/2010 | Durocher et al. |
| 2010/0275614 A1 | 11/2010 | Fontaine et al. |
| 2010/0307165 A1 | 12/2010 | Wong et al. |
| 2011/0000223 A1 | 1/2011 | Russberg |
| 2011/0005234 A1 | 1/2011 | Hashimoto et al. |
| 2011/0061767 A1 | 3/2011 | Vontell et al. |
| 2011/0081239 A1 | 4/2011 | Durocher |
| 2011/0081240 A1 | 4/2011 | Durocher et al. |
| 2011/0085895 A1 | 4/2011 | Durocher et al. |
| 2011/0214433 A1 | 9/2011 | Feindel et al. |
| 2011/0262277 A1 | 10/2011 | Sjoqvist et al. |
| 2011/0302929 A1 | 12/2011 | Bruhwiler |
| 2012/0111023 A1 | 5/2012 | Sjoqvist et al. |
| 2012/0156020 A1 | 6/2012 | Kottilingam et al. |
| 2012/0186254 A1 | 7/2012 | Ito et al. |
| 2012/0204569 A1 | 8/2012 | Schubert |
| 2013/0011242 A1 | 1/2013 | Beeck et al. |

FOREIGN PATENT DOCUMENTS

| | | |
|---|---|---|
| WO | WO 2009/157817 A1 | 12/2009 |
| WO | WO 2010/002295 A1 | 1/2010 |
| WO | WO 2012/158070 A1 | 11/2012 |

OTHER PUBLICATIONS

International Search Report and Written Opinion, dated Apr. 7, 2014, for PCT Application No. PCT/US2013/075475, 11 pages.

* cited by examiner

FLOW DIVERTER ELEMENT AND ASSEMBLY

BACKGROUND

The described subject matter relates to gas turbine engines, and more particularly to seals within gas turbine engines.

Gas turbine engines operate according to a continuous-flow, Brayton cycle. A compressor section pressurizes an ambient air stream, fuel is added and the mixture is burned in a central combustor section. The combustion products expand through a turbine section where bladed rotors convert thermal energy from the combustion products into mechanical energy for rotating one or more centrally mounted shafts. The shafts, in turn, drive the forward compressor section, thus continuing the cycle. Gas turbine engines are compact and powerful power plants, making them suitable for powering aircraft, heavy equipment, ships and electrical power generators. In power generating applications, the combustion products can also drive a separate power turbine attached to an electrical generator.

Seals are required in many locations within a gas turbine engine to regulate air flow to various portions of the engine. From time to time these seals may become damaged, fail or provide for inadequate sealing. This can result in the undesirable heating of engine components.

SUMMARY

An assembly for a gas turbine engine, comprises a fairing assembly extending generally axially through a portion of the gas turbine engine, a first component disposed radially inward of the fairing assembly, a second component disposed axially adjacent to the first component, a flow diverter, and a finger seal. The flow diverter includes a mounting portion securing the flow diverter to the first component, and an arm extending in an axial direction from the mounting portion toward the second component. The finger seal includes a fixed end secured between the flow diverter mounting portion and the first component.

A flow diverter assembly for a gas turbine engine comprises a finger seal and a flow diverter. The flow diverter including a mounting portion and an arm extending generally axially from the mounting portion. The mounting portion includes a snap ring for an interference fitting, and a seal backing ring. The finger seal includes a fixed end fastened to the backing ring.

A flow diverter comprises a mounting portion and an arm. The mounting portion includes a snap ring for an interference fitting, and a seal backing ring. The arm extends generally axially from a junction of the interference fitting and the backing ring.

DETAILED DESCRIPTION

A flow diverter for a gas turbine engine is disposed adjacent a finger seal and between the finger seal and a labyrinth seal. The flow diverter directs a secondary air flow that passes across the finger seal through the labyrinth seal and away from a rotor cavity of the gas turbine engine. The redirected secondary air flow is eventually returned back to a main gas flow passage of the gas turbine engine. The addition of the flow diverter makes interfaces between cavities within the gas turbine engine more robust and less susceptible to unwanted leakage. Additionally, the flow diverter provides for a backup seal function if the finger seal becomes damaged or loses functionality.

Figure 1:
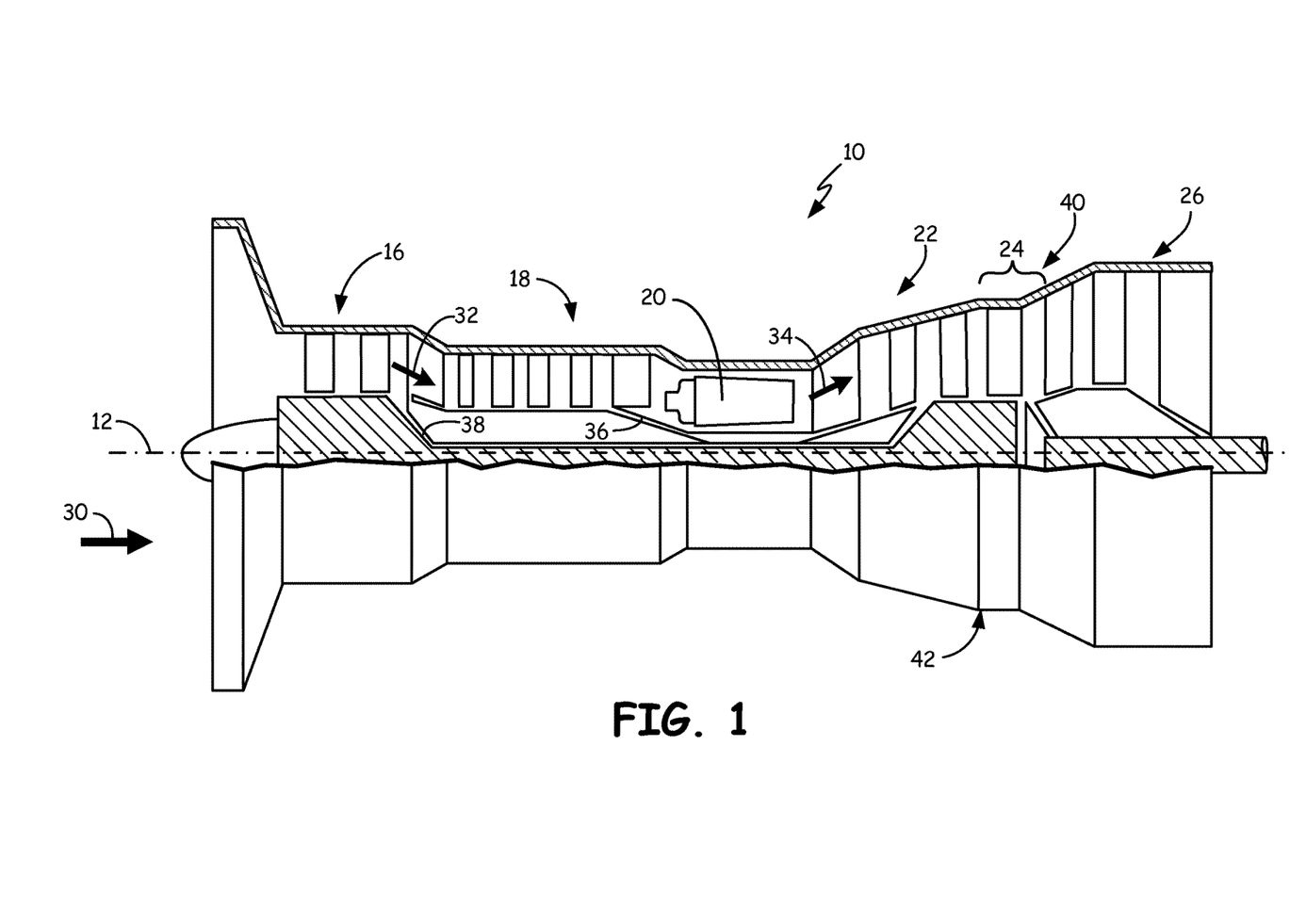
FIG. 1 is a partial cross-sectional view of an exemplary gas turbine engine.

An exemplary industrial gas turbine engine 10 is circumferentially disposed about a central, longitudinal axis or axial engine centerline axis 12 as illustrated in FIG. 1. The engine 10 includes in series order from front to rear, low and high pressure compressor sections 16 and 18, a central combustor section 20 and high and low pressure turbine sections 22 and 24. In some examples, a free turbine section 26 is disposed aft of the low pressure turbine 24. Although illustrated with reference to an industrial gas turbine engine, this application also extends to aero engines with a fan or gear driven fan, and engines with more or fewer sections than illustrated.

As is well known in the art of gas turbines, incoming ambient air 30 becomes pressurized air 32 in compressors 16 and 18. Fuel mixes with pressurized air 32 in the combustor section 20, where it is burned to produce combustion gases 34 that expand as they flow through turbine sections 22, 24 and power turbine 26. Turbine sections 22 and 24 drive high and low pressure rotor shafts 36 and 38 respectively, which rotate in response to the combustion products and thus the attached compressor sections 18, 16. Free turbine section 26 may, for example, drive an electrical generator, pump, or gearbox (not shown).

It is understood that FIG. 1 provides a basic understanding and overview of the various sections and the basic operation of an industrial gas turbine engine. It will become apparent to those skilled in the art that the present application is applicable to all types of gas turbine engines, including those with aerospace applications. Turbine assembly 40 also includes turbine exhaust case (TEC) assembly 42. As shown in FIG. 1, TEC assembly 42 can be disposed axially between low pressure turbine section 24 and power turbine 26. TEC assembly 42 is described in more detail below.

Figure 2:
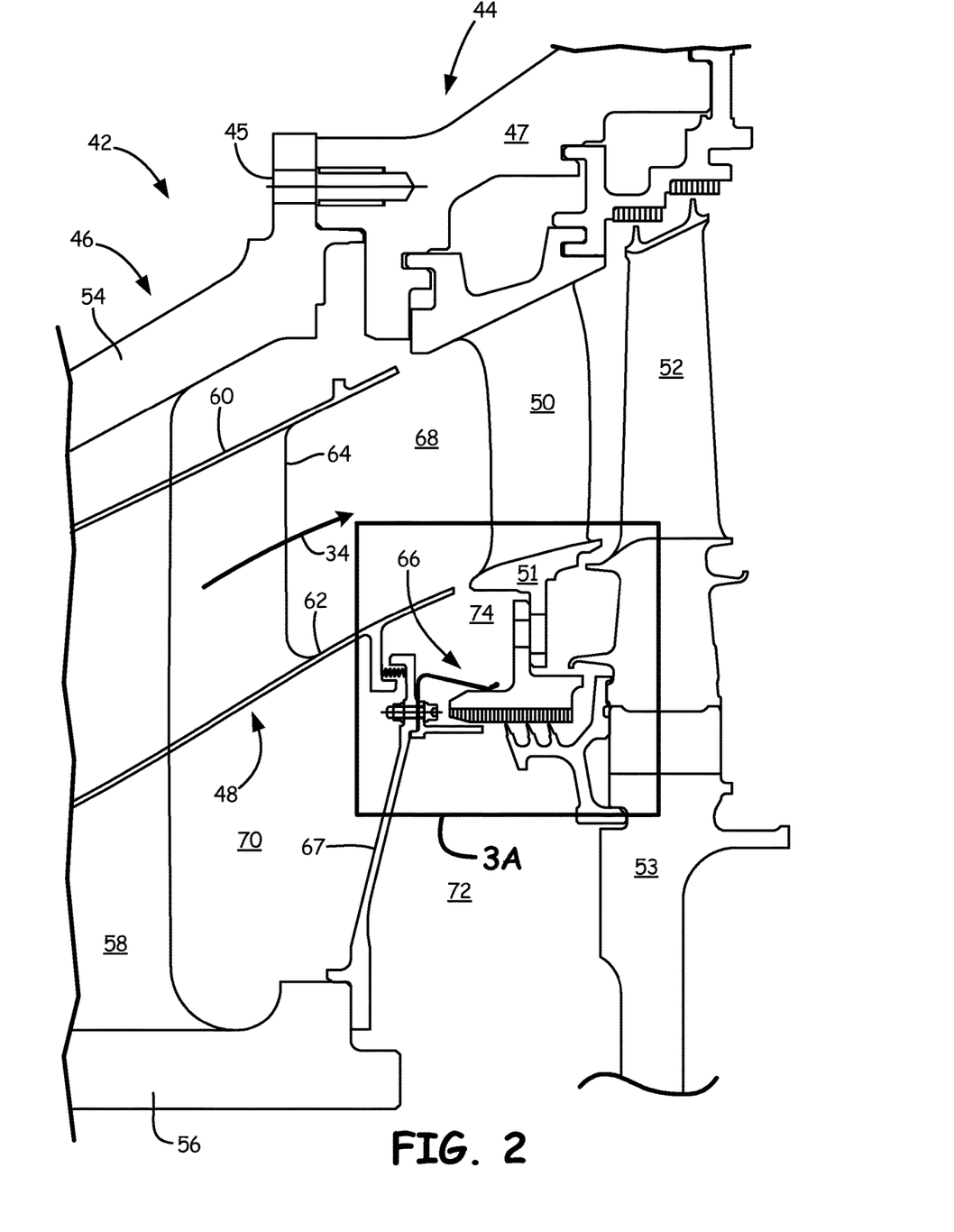
FIG. 2 is a cross-section of an assembly including a finger seal, a flow diverter, and a labyrinth seal.

FIG. 2 shows first module 42 and second module 44 interconnected by fasteners 45. First module 42 is only partially illustrated in FIG. 2 and includes frame 46 and fairing assembly 48. Second module 44 includes an outer radial casing 47, stator vane 50, vane platform 51, rotor blade 52, and rotor disk 53. Frame 46 includes outer radial casing 54, inner radial platform 56, and struts 58. Fairing assembly 48 includes an outer fairing platform 60, inner fairing platform 62, and strut liners 64. Assembly 66 is disposed radially inward of main engine gas flow passage 68. First module 42 additionally includes seal support 67 and first cavity 70. Second cavity 72 is disposed between rotor disk 53 and first module 42 and third cavity 74 is formed between vane platform 51, seal support 67, and inner radial platform 62 of fairing 48.

First module 42 comprises a portion of gas turbine engine 10 (FIG. 1), and therefore, can form portions of compressor sections 16 and 18 or turbine sections 22 and 24. First module 42 includes various components including outer radial casing 54, frame 46, and fairing 48. Second module 44 is connected to first module 42 via fasteners 45 such that modules 42 and 44 abut along outer casings 54 and 47. Second module 44 additionally houses stator vane 50, vane platform 51, rotor blade 52, and rotor disk 53 therein. As shown in the embodiment of FIG. 2, vane 50 and blade 52 are disposed downstream of frame 46 and fairing 48 with respect to the direction of flow of combustion gases 34 along main engine gas flow passage 68.

For simplicity, this particular example is described with reference to turbine exhaust case (TEC) assembly 42 being a first turbine module. However, it will be appreciated that the first module can comprises any suitable turbine module of gas turbine engine 10 such as compressor sections 16, 18 or turbine sections 22, 24. Second module 44 can similarly be a module secured downstream of TEC assembly 42 such as but not limited to power turbine 26.

In the embodiment shown, TEC assembly 42 includes frame 46 which extends axially along and generally radially through main engine gas flow passage 68. Outer radial casing 54 is connected to inner radial platform 56 by struts 58 (only one is shown in FIG. 2). Seal support 67 extends generally radially outward from inner radial platform 56 to adjacent fairing 48. Fairing 48 is affixed to frame 46 and is adapted to be disposed within frame 46 radially inward of outer radial casing 54 and radially outward of inner radial platform 56. Strut liners 64 are adapted to be disposed around struts 58.

Outer radial platform 60 of fairing 48 has a generally conical shape. Similarly, inner radial platform 62 has a generally conical shape. Inner radial platform 62 is spaced from outer radial platform 60 by strut liners 64. Outer radial platform 60, inner radial platform 62, and strut liners 64, form a portion of main engine gas flow passage 68 of gas turbine engine 10 when assembled. Gases such as combustion gases 34 pass through main engine gas flow passage 68 during operation.

Similar to TEC assembly 42, second module 44 includes various components such as outer radial casing 47, stator vane 50, vane platform 51, rotor blade 52, and rotor disk 53. Vane 50 and vane platform 51 are stator components, and platform 51 forms an inner radial edge of main engine gas flow passage 68. Vane platform 51 extends radially inward of main engine gas flow passage 68 to interconnect with and support portions of assembly 66. Rotor disk 53 is disposed radially inward of main engine gas flow passage 68 and is disposed adjacent portions of assembly 66.

As will be discussed subsequently, assembly 66 includes up to three seals and a flow diverter. The first seal and flow diverter can be mounted to one axial side of seal support 67 (mounted to TEC assembly 42). The second seal component can be secured to an axially adjacent turbine module such as second module 44. The third optional seal is disposed on a second axial side of seal support 67 opposite the first seal and the flow diverter.

Seal assembly 66 is located at a radial distance inward from inner radial platform 62 of fairing 48 as well as from main engine gas flow passage 68. Assembly 66 is disposed between first cavity 70, second cavity 72 and third cavity 74.

During operation, assembly 66 acts to limit a secondary and leakage gas flows between these cavities.

Figure 3A:
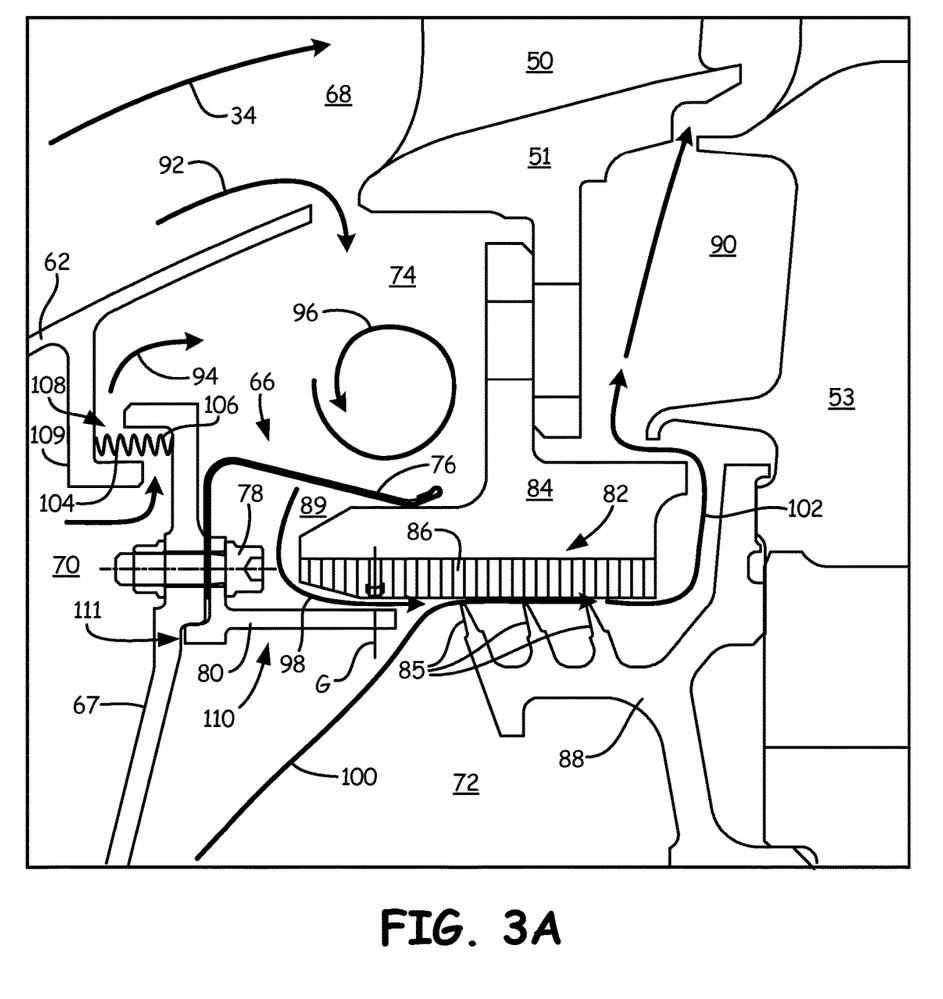
FIG. 3A is an enlarged cross-section of the assembly of FIG. 2 including the finger seal, the flow diverter, and the labyrinth seal.
Figure 3B:
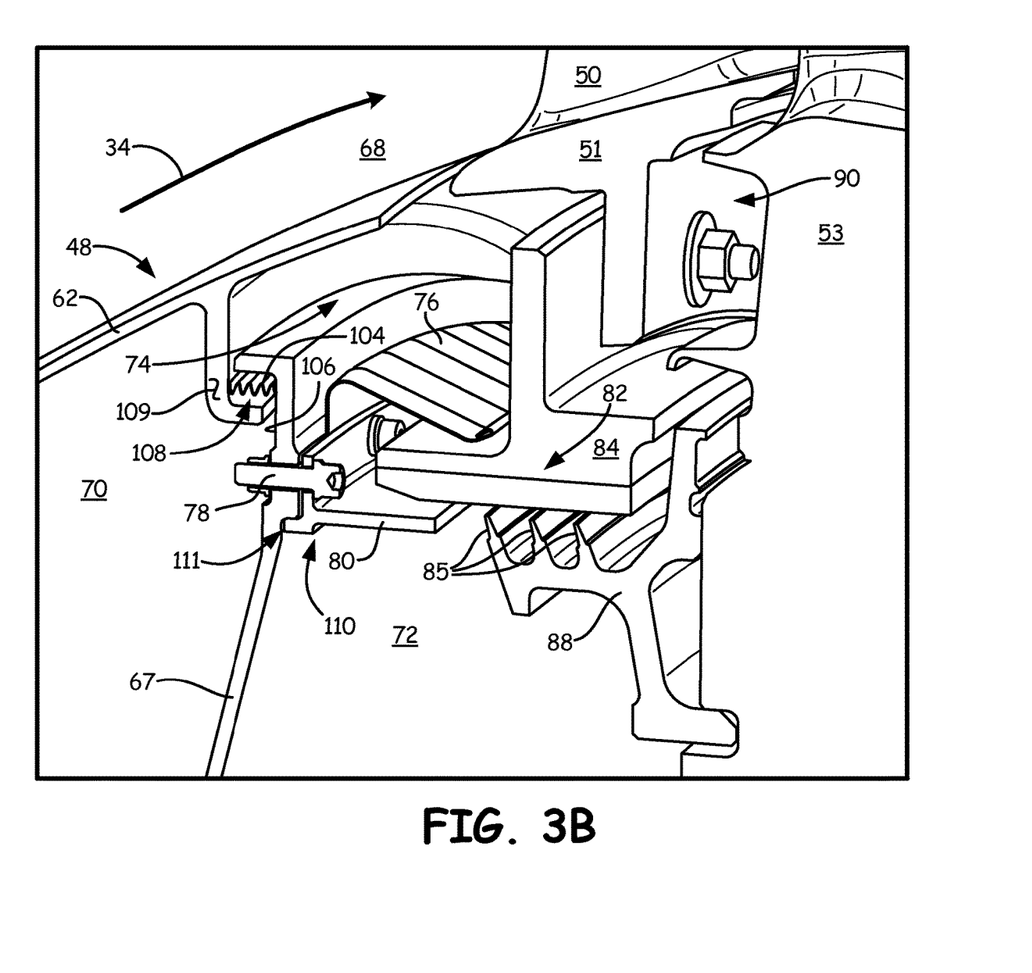
FIG. 3B is a perspective sectional view showing the finger seal, the flow diverter, and the labyrinth seal.

FIGS. 3A and 3B show a cross-section of gas turbine engine 10 (FIG. 1) with assembly 66 mounted radially inward of main engine gas flow passage 68. In addition to fairing 48, vane 50, vane platform 51, rotor disk 53, inner platform 62, seal support 67, first cavity 70, second cavity 72, and third cavity 74, FIGS. 3A and 3B illustrate various components of assembly 66 including finger seal 76, fastener 78, flow diverter 80, and labyrinth seal 82. Labyrinth seal 82 includes land 84 and knife edges 85. Land 84 includes abradable portion 86 such as honeycomb. Knife edges 85 are formed from mini-disk 88. Fourth cavity 89 is formed between finger seal 76 and flow diverter 80. Fifth cavity 90 is formed between rotor disk 53, assembly 66, and vane platform 51.

Assembly 66 limits secondary gas flow from third cavity 74 to second cavity 72. Similarly, assembly 66 limits a leakage gas flow from second cavity 72 to third cavity 74. Assembly 66 can also limit secondary flow between first cavity 70 and second cavity 72. Assembly 66 allows for mixing of the secondary gas flow and leakage gas flow and releases the mixed gas flow back to main engine gas flow passage 68. Assembly 66 makes interfaces between cavities 72 and 74 more robust and less susceptible to unwanted leakage between the cavities 72 and 74. Additionally, assembly 66 provides for a backup seal function in case a portion of assembly 66 becomes damaged or loses functionality. The backup seal function that assembly 66 provides is more durable and cost effective than other backup seal alternatives known in the art.

As shown in FIGS. 3A and 3B various secondary gas flows 92, 94, 96, 98, 100, and 102 can travel between and within cavities 70, 72, 74, 89, and 90. For the purpose of this application, secondary gas flow means any gas flow that is not traveling along main engine gas flow passage 68. As combustion gases 34 travel along main engine gas flow passage 68, a portion of this flow, comprising secondary gas flow 92 of ingestion gas, can pass radially inward of main engine gas flow passage 68 through a gap aft of inner radial platform 62 and forward of vane platform 51. Due to pressure differentials, secondary gas flow 92 enters third cavity 74 where in some instances it is mixed with secondary gas flow 94 comprised of module leakage gas from first cavity 70 to become mixed secondary gas flow 96. In some instances this mixed secondary gas flow 96 can pass across finger seal 76 as indicated by arrow 98. Secondary gas flow 98 is combined and mixed with secondary gas flow 100 (comprised of relatively cooler leakage gas from a rotor cavity such as second cavity 72). The mixed secondary gas flow 102, comprising a mixture of ingestion gas, module leakage gas and/or leakage gas from a rotor cavity, travels back to main engine gas flow passage 68 through labyrinth seal 82 and cavity 90.

In certain embodiments, a volume of secondary gas flow 94 leaving first cavity 70 can be reduced by the addition of optional W-seal 104. W-seal 104 can be resiliently retained against a W-seal land 106 or other surface formed on an axially facing side of seal support 67. In this example, W-seal 104 is disposed in gap 108 between W-seal land 106 and projection 109 extending from a radially inner side of inner fairing platform 62.

W-seal 104 can reduce the volume of secondary flow reaching finger seal 76 from first cavity 70. In this example, finger seal 76 is mounted to seal support 67 at least in part by fastener 78. Finger seal 76 cantilevers to contact and be deflected by an outer radial surface of land 84. Flow diverter 80 is disposed adjacent finger seal 76 radially inward thereof and can also be mounted to seal support 67 at least in part by fastener 78. In other embodiments, finger seal 76 and flow diverter 80 can be additionally and/or alternatively mounted to seal support 67 by other suitable means such as welds, snap rings, rivets, and/or clamps.

As shown in FIG. 3B, flow diverter 80 comprises a full ring and extends away from seal support 67 toward labyrinth seal 82. Flow diverter 80 is positioned to separate fourth cavity 89 from second cavity 72. Flow diverter 80 is spaced from abradable portion 86 of land 84 by a gap G. Thus, flow diverter 80 is disposed so as not to make contact with land 84. Instead, gap G allows for a flow path for secondary gas flow 98 to be directed along an inner radial surface of land 84. In this manner, flow diverter 80 acts to direct secondary gas flow 98 away from second cavity 72 and through labyrinth seal 82. Flow diverter 80 also acts to direct secondary gas flow 100 away from finger seal 76.

Labyrinth seal 82 is comprised of land 84 and knife edges 85 formed from mini-disk 88. Mini-disk 88 is mounted to rotor disk 53 such that knife edges 85 are disposed in close proximity to (or in contact with) abradable portion 86 of land 84. Mixed secondary gas flow 102 passes between land 84 and knife edges 85, around land 84 and rotor disk 53 to fifth cavity 90. From fifth cavity 90 secondary gas flow 102 travels to main engine gas flow passage 68.

The combination of the flow diverter finger seals and W-seal(s) makes interfaces between cavities within the gas turbine engine more robust and less susceptible to unwanted leakage. Additionally, the flow diverter provides for a backup seal function if the finger seal becomes damaged or loses functionality.

Figure 4A:
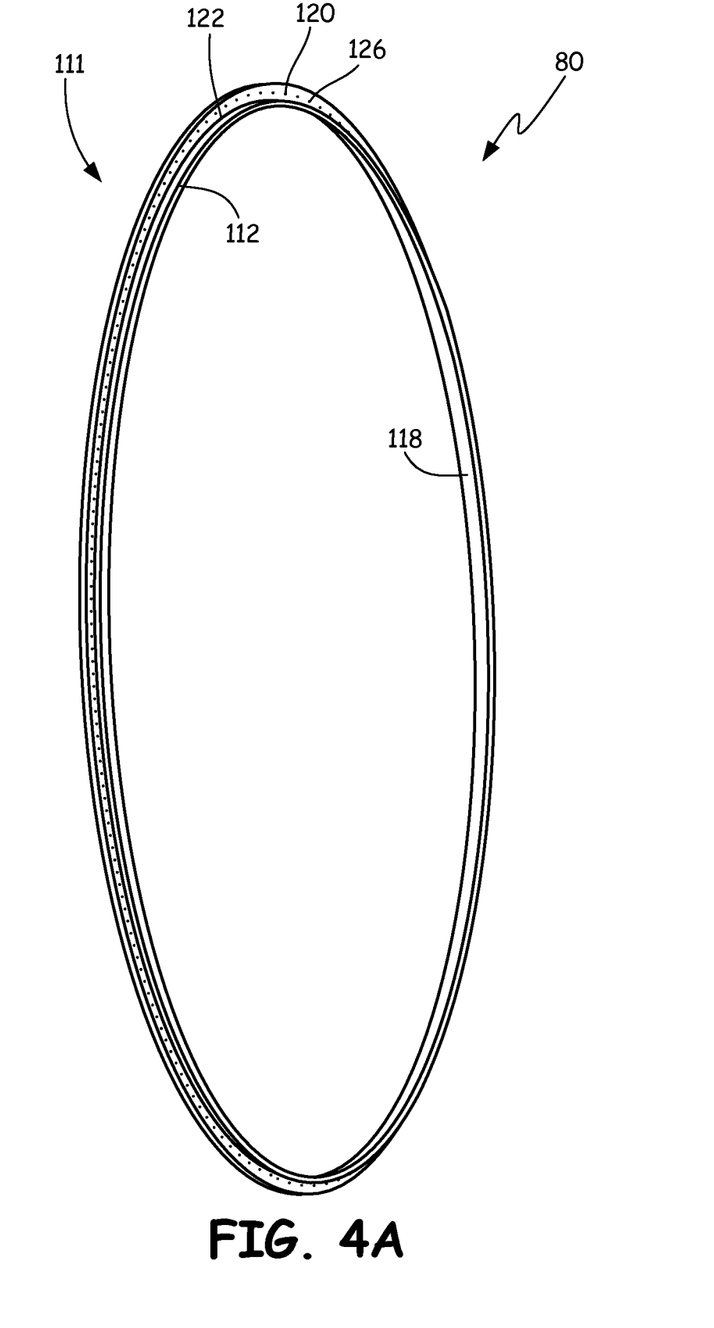
FIG. 4A isometrically shows a flow divider element.
Figure 4B:
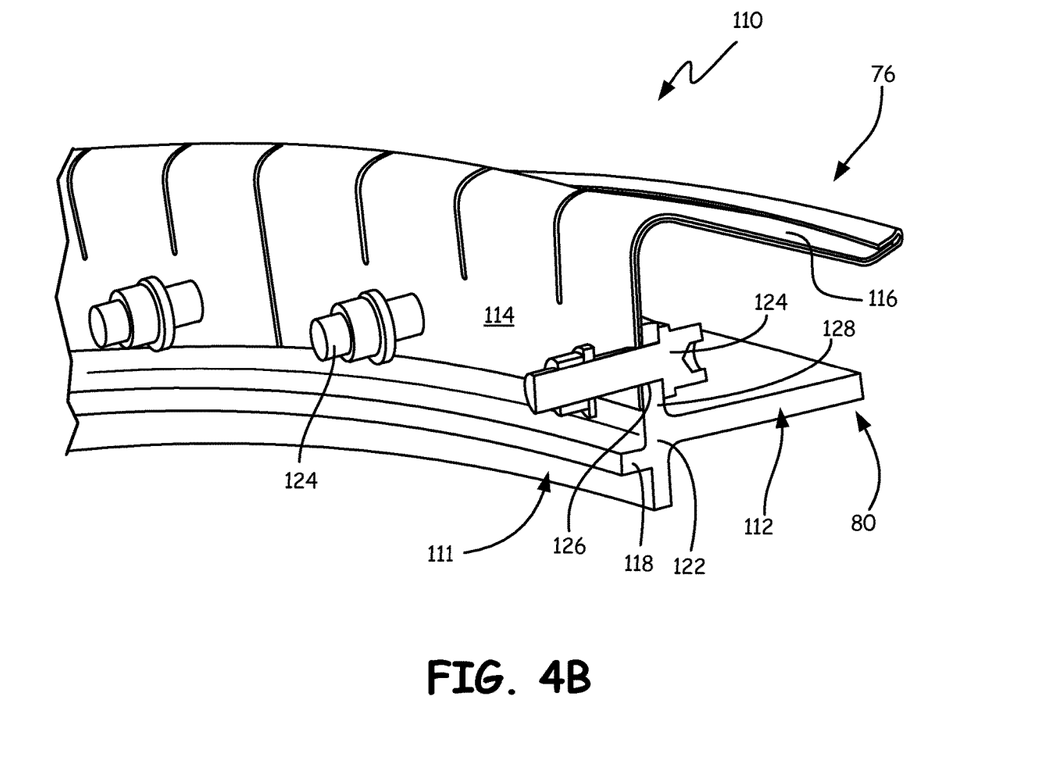
FIG. 4B depicts a flow divider assembly with a finger seal fastened to the flow divider element of FIG. 4A.

FIG. 4A shows an example embodiment of flow diverter 80. FIG. 4B is a cross-section of flow diverter assembly 110 which includes flow diverter 80 and finger seal 76. FIGS. 4A and 4B also show flow diverter mounting portion 111, flow diverter arm 112, finger seal fixed end 114, finger seal free end 116, flow diverter snap ring 118 flow diverter radial flange 120, flow diverter mounting junction 122, fasteners 124, and fastener holes 126.

As was shown in FIGS. 2-3B, gas turbine engine 10 includes fairings 48 extending generally axially through a portion of engine 10, namely through frame 46 of TEC assembly 42. Fairings 48 include several segments 60, 62, 64 which define a portion of main gas flow passage 68 upstream of second module 44 (includes vane 50 and rotor blade 52). Flow diverter assembly 110 can be secured to a first turbine component such as seal support 67 so that the first turbine component retains flow diverter 80 and finger seal 76 radially inward of fairing inner platform 62. Also shown in FIGS. 2-3B, a second component such as labyrinth seal 82 is disposed axially adjacent to seal support 67, with a free end of finger seal 76 contacting a non-abradable surface of labyrinth seal land 84 attached to vane platform 51.

FIGS. 4A and 4B show details of flow diverter 80 including mounting portion 111 and arm 112. Mounting portion 111 is adapted to secure flow diverter 80 to seal support 67 (shown in FIGS. 2-3B), while arm 112 extends in a generally axial direction from mounting portion 110 toward a second component (e.g., labyrinth seal 82 shown in FIGS. 2-3B). Finger seal 76 includes fixed end 114 and free end 116. Finger seal fixed end 114 can be secured between flow diverter mounting portion 110 and a first component (e.g. seal support 67 shown in FIGS. 5A-5B).

Flow diverter mounting portion 111 can include snap ring 118 received by a recess (shown in FIGS. 5A-5B) formed on seal support 67. Mounting portion 110 can also include fastenable radial flange 120 adapted to further secure flow divider 80 to a radial surface of seal support ring 67 (also shown in FIGS. 5A-5B). Flange 120 operates as a backing ring for finger seal 76 to control thermal growth. Arm 112 can be adapted to operate as a backup seal in the event of failure of finger seal 76. In certain embodiments, arm 112 extends generally axially from junction 122 of snap ring 118 and radial flange 120.

Figure 5A:
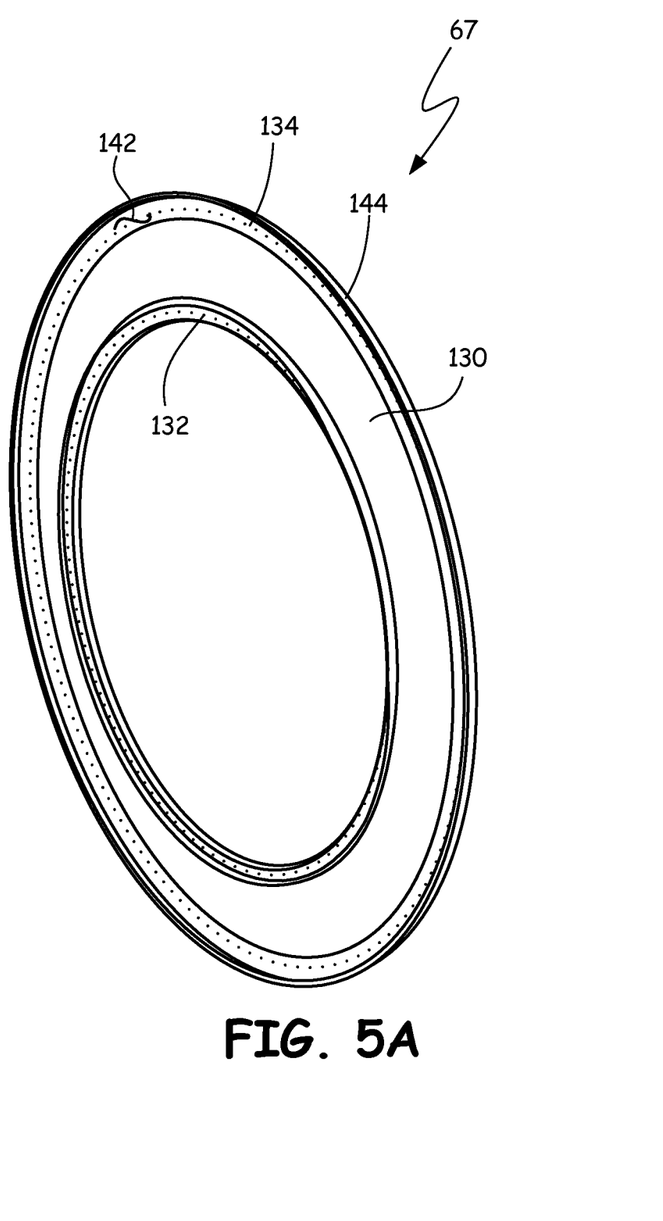
FIG. 5A isometrically depicts a seal support disk.
Figure 5B:
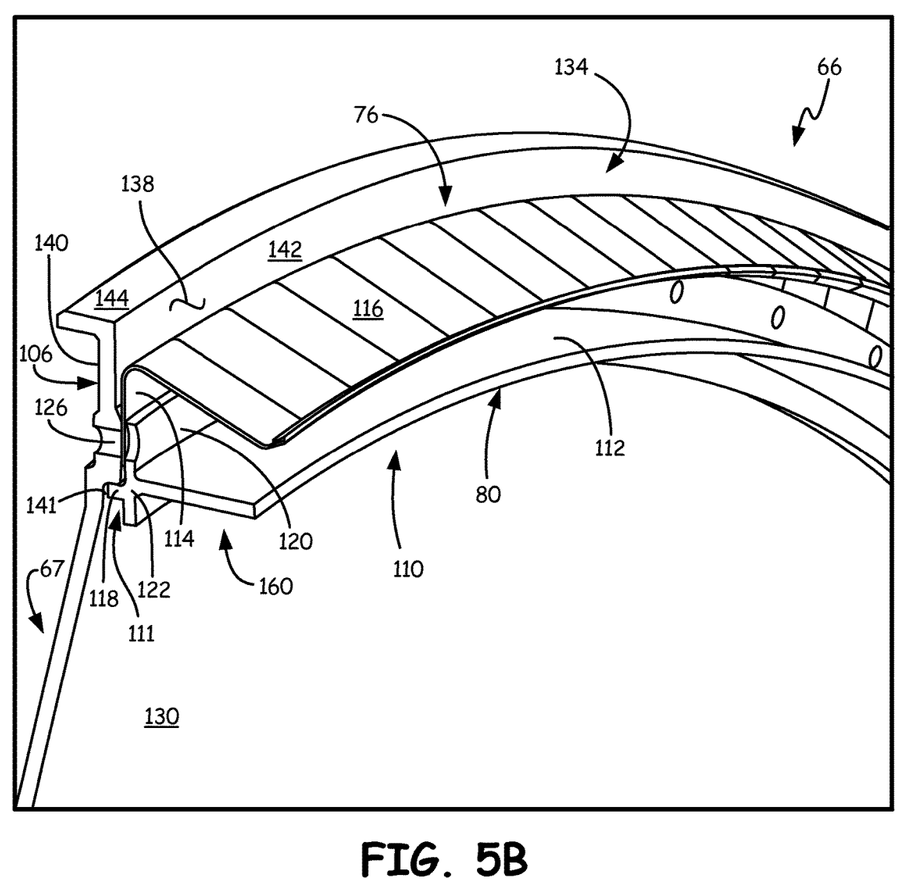
FIG. 5B shows a flow divider assembly fastened to an outer diameter of the seal support disk.

This combination of an interference fit and a flange allows fixed end 114 of finger seal 76 to be commonly fastened using a plurality of circumferentially distributed fasteners 124 for removably securing both flow diverter 80 and a fixed end 114 of finger seal 76 to seal support 67 (shown in FIGS. 5A-5B). Finger seal fixed end 114 can be attached between radial flange 120 and the radial surface of seal support 67. The use of standard bolt fasteners and interference fits for attaching flow divider 80 improves both ease of assembly and repairability, particularly for these and other intermodule sealing components.

Referring back to FIGS. 2-3B, labyrinth seal 82 can be located downstream of seal support 67 and flow diverter assembly 110 with respect to a flow direction 34 through fairing assembly 48. As such, flow diverter arm 112 can be adapted to direct a leakage gas flow from a rotor cavity (e.g. rotor cavity 72) away from finger seal 76. In certain embodiments, radially extending seal support 67 can be secured directly to engine frame 42, such as at the inner frame platform 56 as shown in FIG. 5C.

Figure 5C:
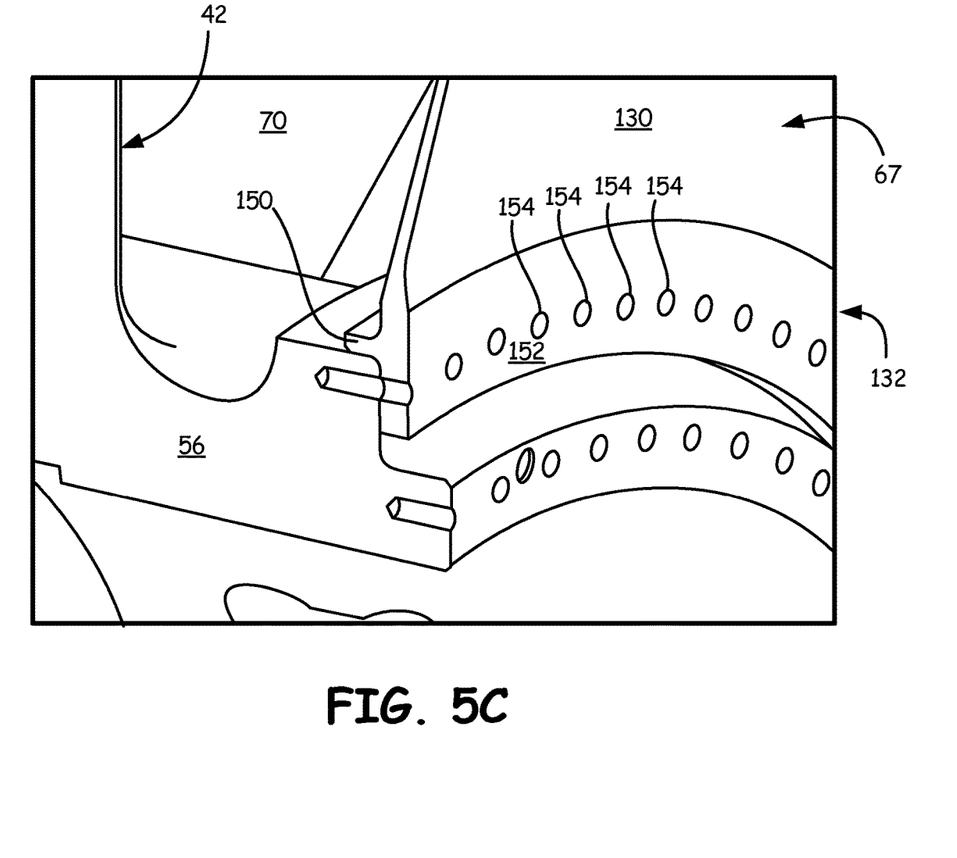
FIG. 5C shows an inner diameter of the seal support disk mounted to a frame.

FIGS. 5A-5C show multiple detailed views of an example embodiment of seal support 67. FIG. 5A is an isometric view of seal support 67 which includes a generally disk-shaped body 130 extending radially between inner mounting portion 132 and outer seal carrier portion 134.

Inner mounting portion 132 can be fastened to a turbine module (e.g., TEC assembly 42 shown in FIGS. 2-3B) such that seal support 67 forms a boundary between adjacent cavities (e.g. between first annular cavity 70 in TEC assembly 42, and second annular cavity 72 in second module 44 also shown in FIGS. 2-3B). In this example, body 130 has a slight axial angle to account for the slightly different axial positioning of fairing 48 relative to frame 46 (See, e.g., FIG. 2). As shown in FIG. 5B, seal carrier portion 134 can be adapted to receive flow diverter assembly 110 around an outer diameter of disk-shaped body 130.

FIG. 5B shows flow diverter assembly 110 mounted to seal carrier portion 134 formed around an outer diameter of seal support body 130. FIG. 5B also includes seal carrier first axial side 138, second axial side 140, seal carrier recess 141, axial land portion 142, and radial land portion 144.

First axial side 138 can be adapted to receive flow diverter 80 and finger seal 76, while second axial side 140 includes a seal land adapted to resiliently retain a W-seal (e.g., W-seal 104 shown in FIGS. 3A-3B). First axial side 138 of seal carrier portion 134 can include recess 141 adapted to receive a snap ring (e.g. snap ring 118 of flow diverter 80) which can create an interference fit between support disk mounting portion 111 and inner frame portion 56 (shown in FIGS. 3A-3B). Flow diverter assembly 110 can include flow diverter 80 and finger seal 76 commonly fastened around first axial side 138 of seal carrier portion 134. Finger seal fixed end 114 is fastened between flow diverter 76 and first axial side 138 of seal carrier portion 134. As was shown in FIGS. 2-3B, seal carrier 67 can be adapted to retain flow diverter 80 and finger seal 76 (flow diverter assembly 110) at a location radially inward from fairing assembly 48, which extends generally axially through TEC assembly 42 to define main gas flow passage 68.

W-seal land 106 can be formed on second axial side 140 (opposite first axial side 138) of seal carrier portion 134. As shown in FIGS. 2-3B, seal assembly 66 can also include optional W-seal 104 resiliently retained against W-seal land 106 in gap 108. Axial land portion 142 and radial land portion 144 define two sides of gap 108 (also shown in FIGS. 2-3B) between first cavity 70 and third cavity 74. The remaining two sides of gap 108 can be defined by fairing projection 109 (shown in FIGS. 3A-3B).

FIG. 5C shows inner diameter mounting portion 132 of seal support disk 67 mounted to inner frame portion 56 of TEC assembly 42. In one example, TEC assembly frame 46 can be a steel frame for a turbine exhaust case (TEC) assembly adapted to be assembled between two adjacent turbine modules for a gas turbine engine. In this example, the TEC assembly can be installed between low pressure turbine module 24 and power turbine module 26 shown in FIG. 1. In other examples, TEC assembly 42 can include a steel or superalloy frame, and be located between an intermediate pressure or high pressure turbine module, and a low pressure turbine module.

As seen in FIG. 5C, mounting portion 132 of seal support disk 67 comprises snap ring 150 and fastenable flange 152 adapted to receive fasteners or other standard removable fasteners through holes 154 for removably securing seal support disk 67 to TEC assembly 42. This configuration allows seal support disk 67, flow diverter 80, and finger seal 76 to be replaceable as a single unit. Seal support disk 67 can be heated around its inner diameter and snapped to frame 46 (shown in FIG. 2), while finger seal free end 116 can be installed so that it contacts a non-abradable surface of labyrinth seal 82 (also shown in FIG. 2). Combining several elements into seal support disk 67 simplifies manufacture, assembly, and repairs. Multiple seals can be secured to embodiments of support disk via snap on fittings and standard fasteners allowing for preassembly and quick removal as a single assembly, and can be adapted to control secondary air flows for distributing cooling air. They also allow for simple repair and replacement of individual parts.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An assembly for a gas turbine engine, comprising:
a fairing assembly extending generally axially through a portion of the gas turbine engine;
a first component comprising a radially extending seal support ring secured to a frame of the gas turbine engine and disposed radially inward of the fairing assembly;
a second component, disposed axially adjacent to the first component;
a flow diverter including a mounting portion securing the flow diverter to the first component, and an arm extending in an axial direction from the mounting portion toward the second component; and
a finger seal including a fixed end secured between the flow diverter mounting portion and the first component;
wherein the mounting portion includes a snap ring received by a recess on the first component, and a radial flange bolted to a radial surface of the first component; and
wherein the fixed end of the finger seal is bolted between the radial flange and the radial surface of the first component.

2. The assembly of claim 1, wherein the second component is located downstream of the first component with respect to a direction of flow through the fairing assembly, and wherein the flow diverter directs a leakage gas flow from a rotor cavity away from the finger seal.

3. The assembly of claim 1, wherein the flow diverter and the second component are arranged to form a gap therebetween for redirecting a secondary gas flow passing across the finger seal, along the second component.

4. The assembly of claim 1, wherein the second component includes a gap for returning at least a portion of the secondary gas flow back to the main gas flow passage of the gas turbine engine.

5. A flow diverter assembly for a gas turbine engine, comprising:
a flow diverter element including a mounting portion and an arm extending generally axially from the mounting portion, the mounting portion including a snap ring for an interference fitting, and a seal backing ring;
a finger seal including a fixed end and a free end, the fixed end fastened to the backing ring;
a first gas turbine engine component, wherein the finger seal is fastened between the flow diverter backing ring and a radial surface of the first gas turbine engine component; and
a second gas turbine engine component disposed axially adjacent to the first gas turbine engine component, wherein a free end of the finger seal contacts a surface of a second gas turbine engine component disposed axially adjacent to the first gas turbine engine component;
wherein the second gas turbine engine component comprises a labyrinth seal.

6. The flow diverter assembly of claim 5, wherein the first gas turbine engine component comprises a radially extending seal support ring.

7. The flow diverter assembly of claim 5, wherein the arm is adapted to operate as a backup seal for the finger seal.

8. The flow diverter assembly of claim 5, wherein the finger seal and the flow diverter are positioned in a rotor cavity radially inward of a main gas flow passage of the gas turbine engine for directing a secondary gas flow away from the rotor cavity and back toward the main gas flow passage.

9. The flow diverter assembly of claim 8, wherein the secondary gas flow is routed around one or more components of the gas turbine engine.

10. A flow diverter for a gas turbine engine, the flow diverter comprising:
a mounting portion including a snap ring for an interference fitting, and a seal backing ring;
a flow diverter arm extending generally axially from a junction of the interference fitting and the backing ring; and
a first gas turbine engine component, wherein the snap ring is received by a recessed portion of the first gas turbine engine component; and
wherein the backing ring is a radial flange comprising a plurality of circumferentially distributed fastener holes for removably securing both the flow diverter and a fixed end of a finger seal to a first gas turbine engine component.

11. The flow diverter of claim 10, wherein the first gas turbine engine component comprises a seal support disk.

* * * * *